US006588701B2

(12) United States Patent
Yavnai

(10) Patent No.: US 6,588,701 B2
(45) Date of Patent: Jul. 8, 2003

(54) UNMANNED MOBILE DEVICE

(75) Inventor: Arie Yavnai, Kiryat Blallk (IL)

(73) Assignee: Rafael Armament Development Authority, Ltd., Haifa (IL)

(*) Notice: Subject to any disclaimer, the term of this patent is extended or adjusted under 35 U.S.C. 154(b) by 0 days.

(21) Appl. No.: 09/961,447

(22) Filed: Sep. 25, 2001

(65) Prior Publication Data
US 2002/0060267 A1 May 23, 2002

(30) Foreign Application Priority Data
Sep. 26, 2000 (IL) ............................................... 138695

(51) Int. Cl.⁷ .............................................. B64C 29/00
(52) U.S. Cl. ................. 244/23 A; 244/23 B; 244/23 C; 244/12.1
(58) Field of Search ............................. 244/23 A, 23 B, 244/23 C, 12.1–12.6, 67, 186, 190, 82; 416/20 A, 20 R; 180/8.1, 8.2, 8.5, 8.6, 901, 903

(56) References Cited

U.S. PATENT DOCUMENTS

| | | | | |
|---|---|---|---|---|
| 2,918,738 A | * | 12/1959 | Barr ............................ | 180/8.6 |
| 3,002,578 A | * | 10/1961 | Kraus .......................... | 180/8.1 |
| 3,054,578 A | * | 9/1962 | Brocard ...................... | 244/23 C |
| 4,037,807 A | * | 7/1977 | Johnston et al. ............ | 244/12.1 |
| 4,202,518 A | * | 5/1980 | Burnham et al. ........... | 244/12.1 |
| 4,386,748 A | * | 6/1983 | Jordan ........................ | 244/12.2 |
| 4,461,436 A | * | 7/1984 | Messina ..................... | 244/23 C |
| 4,527,650 A | * | 7/1985 | Bartholet .................... | 180/8.6 |
| 4,565,487 A | * | 1/1986 | Kroczynski ................. | 180/8.6 |
| 4,566,699 A | * | 1/1986 | Cucuzza ..................... | 244/12.2 |
| 4,662,465 A | * | 5/1987 | Stewart ....................... | 180/8.1 |
| 5,005,658 A | * | 4/1991 | Bares et al. ................. | 180/8.1 |
| 5,035,377 A | * | 7/1991 | Buchelt ....................... | 244/12.1 |
| 5,039,031 A | * | 8/1991 | Valverde ..................... | 244/12.2 |

(List continued on next page.)

OTHER PUBLICATIONS

Borenstein, J., et al., "Mobile Robot Positioning—Sensors and Techniques", The Journal of Robotic Systems, vol. 14, No. 4, 1997, pp. 231–249.

Chen, Chun–Hung et al., "Motion Planning of Walking Robots in Environments with Uncertainty", Journal of Robotic Systems, John Wiley & Sons, Inc. vol. 16, No. 10, pp. 527–545, 1999.

Todd, D.J., "Walking Machines—An Introduction to Legged Robots", Kogan Page Ltd., London U.K., 1985, pp. 63–1687.

Movarec, Hans P., "Robot Rover Visual Navigation", UMI Research Press, Ann Arbor, Michigan, 1981, pp. 49–147.

Robert, Luc, et al., "Applications of Non–Metric Vision to Some Visually Guided Robotic Tasks", in Aloimonos, Yiannis, ed., "Visual Navigation—From Biological Systems to Unmanned Ground Vehicles", Lawrence Erlbaum Associates Publishers, Mahwah, New Jersey, 1997, pp. 89–134.

(List continued on next page.)

Primary Examiner—Charles T. Jordan
Assistant Examiner—Stephen A Holzen
(74) Attorney, Agent, or Firm—Birch, Stewart, Kolasch & Birch, LLP

(57) ABSTRACT

A remotely-controlled unmanned mobile device (UMD) adapted to function as a robot scout to enter and reconnoiter the site of a disaster and to communicate to a rescue mission information regarding conditions prevailing at the site, making it possible for the mission to decide on rescue measures appropriate to these conditions. The UMD is operable in either of two modes. In its air-mobility mode the UMD is able to vertically take off and land, to fly to the site and then hover thereover. In its ground-mobility mode, the UMD can walk on legs over difficult terrain and through wrecked structures and ruins. The UMD is provided with condition-sensitive sensors for gathering data regarding conditions prevailing at the site, and position-sensitive sensors for avoiding obstacles in the path of the walking UMD, thereby assuring safe mobility. Other sensors govern geo-referenced navigation and flight control functions.

21 Claims, 9 Drawing Sheets

U.S. PATENT DOCUMENTS

| | | | | | |
|---|---|---|---|---|---|
| 5,040,626 | A | * | 8/1991 | Paynter | 180/8.1 |
| 5,064,143 | A | * | 11/1991 | Bucher | 244/12.2 |
| 5,121,805 | A | * | 6/1992 | Collie | 180/8.1 |
| 5,149,012 | A | * | 9/1992 | Valverde | 244/12.2 |
| 5,170,963 | A | * | 12/1992 | Beck, Jr. | 244/12.2 |
| 5,178,344 | A | * | 1/1993 | Dlouhy | 244/12.2 |
| 5,213,284 | A | * | 5/1993 | Webster | 244/12.2 |
| 5,219,410 | A | * | 6/1993 | Garrec | 180/8.1 |
| 5,295,643 | A | | 3/1994 | Ebbert et al. | |
| 5,303,879 | A | * | 4/1994 | Bucher | 244/12.2 |
| 5,340,056 | A | | 8/1994 | Guelman et al. | |
| 5,351,911 | A | * | 10/1994 | Neumayr | 244/12.2 |
| 5,351,913 | A | * | 10/1994 | Cycon et al. | 244/12.2 |
| 5,383,810 | A | * | 1/1995 | Loving | 244/12.2 |
| 5,502,638 | A | | 3/1996 | Takenaka | |
| 5,758,734 | A | * | 6/1998 | Hong et al. | 180/8.1 |
| 5,762,153 | A | * | 6/1998 | Zamagni | 180/8.6 |
| 5,842,533 | A | | 12/1998 | Takeuchi | |
| 6,050,520 | A | * | 4/2000 | Kirla | 244/10 |
| 6,170,778 | B1 | * | 1/2001 | Cycon et al. | 244/12.3 |
| 6,230,835 | B1 | * | 5/2001 | Fischer et al. | 114/273 |
| 6,254,032 | B1 | * | 7/2001 | Bucher | 244/12.2 |
| 6,270,038 | B1 | * | 8/2001 | Cycon et al. | 244/12.2 |
| 6,375,117 | B1 | * | 4/2002 | Cain | 244/23 C |
| 6,398,159 | B1 | * | 6/2002 | Di Stefano | 244/12.2 |

OTHER PUBLICATIONS

Weng, J.J. et al., "Visual Navigation Using Fast Content–Based Retrieval", in Aloimonos, Yiannis, ed., "Visual Navigation—From Biological Systems to Unmanned Ground Vehicles", Lawrence Erlbaum Associates Publishers, Mahwah, New Jersey, 1997, pp. 178–217.

Dean, Thomas et al., "Planning and Navigation in Stochastic Environments", in Aloimonos, Yiannis, ed., "Visual Navigation—From Biological Systems to Unmanned Ground Vehicles", Lawrence Erlbaum Associates Publishers, Mahwah, New Jersey, 1997, pp. 251–274.

Adams, Martin David, "Sensor Modeling, Design and Data Processing for Autonomous Navigation", World Scientific Publishers, Singapore, 1999, pp. 153–208.

Song, Shin–Min, et al., "Machines That Walk", The Mit Press, Cambridge, MA 1989, pp. 23–281.

Fahlstrom, Paul G., et al., "Introduction to UAV Systems", UAV Systems, Inc., Columbia, Maryland, 1993, pp. II 42–II 47.

Yavnai A., "Distributed Decentralized Architecture for Autonomous Cooperative Operation of Multiple Agent System", in Proceedings of IEEE Symposium on Autonomous Underwater Vehicle Technology, Jul. 19–20, 1994, Cambridge, pp. 61–67.

Arlowe, H.D., "Airborne Remote Operated Device", Proceedings of the 15th Annual Technical Symposium of the Association of Unmanned Vehicle Systems, San–Diego, CA., Jun. 6–8, 1988 pp. 1–13.

Even, S., "Graph Algorithms", Computer Science Press, Maryland, USA, 1979, pp. 1–245.

Todd, D.J., "Walking Machines—An Introduction to Legged Robots", Kogan Page Ltd., London U.K., 1985, pp. 91–150.

Song, Shin–Min, et al., "Machines That Walk", The MIT Press, Cambridge, MA 1989, pp. 23–164.

* cited by examiner

UNMANNED MOBILE DEVICE

BACKGROUND OF THE INVENTION

1. Field of the Invention

This invention relates generally to remotely-controlled unmanned mobile devices adapted to function as a robot scout to gather information regarding conditions prevailing at a disaster site and to communicate this information to a rescue mission.

2. Status of Prior Art

In disaster situations, the availability of timely and accurate information regarding conditions prevailing at the site of the disaster may be crucial to the success of a rescue mission. Typical, yet not exclusive, of such situations are an explosion at a chemical manufacturing facility, the leakage of hazardous materials at an urban site, a nuclear reactor accident or an earthquake as well as other serious ecological and natural catastrophes.

Should a rescue mission seek to gain advance information regarding conditions prevailing in the region of a disaster so that the mission can decide on appropriate rescue procedures, in many cases this attempt may expose scouts assigned to this task to life-threatening risks. For example, if the disaster area is the site of a nuclear reactor accident in which released into the area are lethal radioactive particles, scouts would be ill advised to enter this area.

The present invention resides in a remotely-controlled unmanned mobile device (UMD) functioning as a robot scout adapted to enter and reconnoiter a disaster site in behalf of a rescue mission to gather information in regard to conditions prevailing at the site and to communicate this information to the mission. The UMD is operable either in an air-mobility mode or in a ground-mobility mode, so that it is capable of fully exploring the site. While conditions prevailing at the site of a disaster may threaten the life of a living scout, they can do no injury to a robot scout.

Because in its air-mobility mode the UMD operates in a manner similar to that of a vertical take-off and landing vehicle (VTOL), of prior art interest in this regard is the unmanned VTOL air vehicle described e.g. in U.S. Pat. No. 5,295,643 to Ebbert et al. This device is capable of vertical take-off and landing in confined areas. It is also capable of transition to horizontal high speed flight and is able to hover and loiter for a period of time. The vehicle includes coaxial forward and aft centerbodies, and a ducted rotor having a plurality of propellers. The ducted fan is aerodynamically efficient and is safe because of its unexposed rotor blades.

And since a UMD in accordance with the invention when operating in a ground mobility mode can walk on the terrain of the disaster site, however difficult the terrain, of prior art interest is the multi-legged walking robot disclosed e.g. by Takeuchi in U.S. Pat. No. 5,842,533. This device is capable of walking on uneven ground while carrying a payload. This multi-legged walking robot provides some of the basic capabilities for the ground mobility portion of a dual-mode UMD device in accordance with the invention.

In the six-legged walking robot described by Paynter in U.S. Pat. No. 5,040,626, each leg, composed of two links, has three controlled degrees-of-freedom of rotary motion. This device is also capable of walking on uneven ground and carrying a payload.

Obstacle avoidance and indoor navigation capability is needed in order to execute the mission of a robot scout in a disturbed environment. A system for obstacle avoidance and path planning is disclosed by Takenaka in U.S. Pat. No. 5,502,638. A survey of sensors and techniques appropriate for indoor positioning is set forth in Borenstein, J., et. al., "Mobile Robot Positioning—Sensors and Techniques", The Journal of Robotic Systems, Vol. 14, No. 4, 1997, pp. 231–249, and in Borenstein, J., et. Al., "Navigating Mobile Robots: Sensors and Techniques", A. K. Peters Ltd., Wellesley, Mass., 1995.

Of prior art background interest regarding ducted fan VTOL devices, walking robots, distributed decentralized command and control of multiple mobile devices, as well as a unit for command control of mobile devices are the following U.S. patents:

U.S. Pat. No. 5,295,643 (1994)—ducted fan VTOL
U.S. Pat. No. 5,842,533 (1998)—legged robot
U.S. Pat. No. 5,040,626 (1991)—legged robot
U.S. Pat. No. 5,502,638 (1996)—path planning and obstacle avoidance
U.S. Pat. No. 5,340,056 (1994)—Active defense system—cooperative Operation of multiple UAVs (distributed-decentralized command and control of multiple unmanned devices).

Also of prior art interest in regard to various features included in a UMD robot scout in accordance with the invention are the following publications:

Chen, Chun-Hung et. al., "Motion Planning of Walking Robots in Environments with Uncertainty", Journal of Robotic Systems, John Wiley & Sons, Inc., Volume 16, No. 10, 1999, pp. 527–545.

Todd, D. J., "Walking Machines—An Introduction to Legged Robots", Kogan Page Ltd., London U.K., 1985, pp. 63–168.

Movarec, Hans P., "Robot Rover Visual Navigation", UMI Research Press, Ann Arbor, Mich., 1981, pp. 49–147.

Thorpe, Charles E., ed., "Vision and Navigation", Kluwer Academic Publishers, Norwell Mass., 1990, pp.

Robert, Luc, et. al., "Applications of Non-Metric Vision to Some Visually Guided Robotic Tasks", in Aloimonos, Yiannis, ed., "Visual Navigation—From Biological Systems to Unmanned Ground Vehicles", Lawrence Erlbaum Associates Publishers, Mahwah, N.J., 1997, pp. 89–134.

Weng, J. J., et. al.,"Visual Navigation Using Fast Content-Based Retrieval", in Aloimonos, Yiannis, ed., "Visual Navigation—From Biological Systems to Unmanned Ground Vehicles", Lawrence Erlbaum Associates Publishers, Mahwah, N.J., 1997, pp. 178–217.

Dean, Thomas, et. al., "Planning and Navigation in Stochastic Environments", in Aloimonos, Yiannis, ed., "Visual Navigation—From Biological Systems to Unmanned Ground Vehicles", Lawrence Erlbaum Associates Publishers, Mahwah, N.J., 1997, pp., 251–274.

Adams, Martin David, "Sensor Modeling, Design and Data Processing for Autonomous Navigation", World Scientific Publishers, Singapore, 1999, pp. 153–208.

Song, Shin-Min, et. al., "Machines That Walk", The MIT Press, Cambridge, Mass., 1989, pp. 23–281.

Fahlstrom, Paul G., et. al., "Introduction to UAV Systems", UAV Systems Inc., Columbia, Md., 1993, pp. II 42-II 47.

Kohlman, David L., "Introduction to V/STOL Airplanes", Iowa State University Press, Ames, Iowa, 1981.

Yavnai A., "Distributed Decentralized Architecture for Autonomous Cooperative Operation of Multiple Agent System", in Proceedings of IEEE Symposium on Autonomous Underwater Vehicle Technology, Jul. 19–20, 1994, Cambridge, pp. 61–67.

Arlowe, H. D., "Airborne Remote Operated Device", Proceedings of the 15th Annual Technical Symposium of the Association of Unmanned Vehicle Systems, San-Diego, Calif., Jun. 6–8, 1988, pp. 1–13.

Borenstein, J., et. al., "Mobile Robot Positioning—Sensors and Techniques", The Journal of Robotic Systems, Vol. 14, No. 4, 1997, pp. 231–249.

Borenstein, J., et. al., "Navigating Mobile Robots: Sensors and Techniques", A.K. Peters Ltd., Wellesley, Mass., 1995.

Even, S., "Graph Algorithms", Computer Science Press, Maryland, USA, 1979.

SUMMARY OF THE INVENTION

In view of the foregoing, the main object of this invention is to provide a remotely-controlled unmanned mobile device (UMD) adapted to function as a robot scout in behalf of a rescue mission to enter and reconnoiter the site of a disaster, to gather information regarding conditions prevailing at this site and to communicate this information to the mission which can then decide on rescue actions appropriate to the prevailing conditions. The UMD may be adapted to additional functions, all as required and appropriate.

More particularly an object of this invention is to provide a dual mobility UMD which is operable either in an air mobility mode or in a ground mobility mode, making it possible for the robot scout to fully explore the disaster site.

Among the significant advantages of a UMD robot scout according to the invention are the following:

A. The UMD can fly from a nearby safe station to the disaster area and reconnoiter the area to gather information regarding the conditions which prevail in the area, which information is conveyed to rescue mission personnel who are exposed to no risk in gathering the information.

B. When the UMD arrives at a disaster area, its on-board sensors then proceed to collect the information required by the rescue mission, which information is communicated to rescue mission personnel who are thereby advised of possible dangers they may encounter when entering the disaster area and can then take steps to avoid these dangers.

C. In its ground mobility mode, the UMD can traverse difficult terrain and walk through wrecked structures and ruins in order to reconnoiter the entire site.

D. When several UMD's are enlisted by a rescue mission to reconnoiter a disaster area, they can communicate with each other to coordinate their activity.

E. The UMD is compact in form and light in weight, being composed mainly of miniature components.

F. The UMD should preferably be equipped with payload, which can be activated whenever required.

Briefly stated, these objects are accomplished in a remotely-controlled unmanned mobile device (UMD) adapted to function as a robot scout to enter and reconnoiter the site of a disaster and to communicate to a rescue mission information regarding conditions prevailing at the site, making it possible for the mission to decide on rescue measures appropriate to these conditions.

The UMD is operable in either of two modes. In its air-mobility mode, the UMD is able to vertically take off and land, to fly to the site and then hover thereover. In its ground-mobility mode, the UMD can walk on its legs over difficult terrain and through wrecked structures and ruins. The UMD is provided with condition-sensing detectors for gathering data regarding conditions prevailing at the site, and position-sensing sensors for avoiding obstacles in the path of the walking UMD, thereby assuring safe mobility. Other sensors govern geo-referenced navigational and flight control functions.

BRIEF DESCRIPTION OF THE DRAWINGS:

For a better understanding of the invention as well as other objects and features thereof, reference is made to the annexed drawing wherein:

FIG. 1(a) showing the device when its legs are retracted, FIG. 1(b) showing the same device with its legs extended;

DETAILED DESCRIPTION OF THE INVENTION

Whilst for connivance of explanation, the description focuses mainly in UMD that is utilized by rescue forces in disaster areas, those versed in the art will readily appreciate that the UMD of the invention is by no means bound by this application. Accordingly, the UMD of the invention may be utilized by an operator or operators in any area of interest.

Figure 1A:
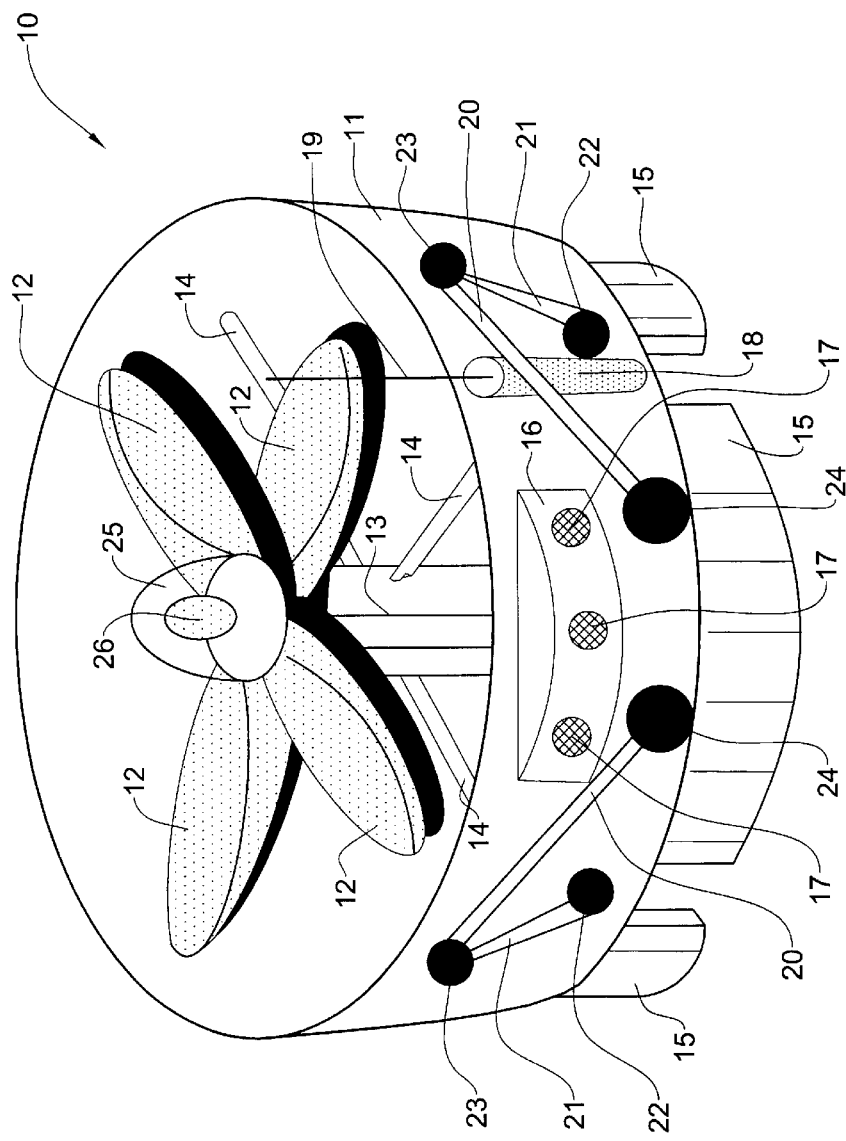
FIGS. 1(a) and 1(b) are perspective views of an unmanned mobile vehicle in accordance with a preferred embodiment of the invention.
Figure 1B:
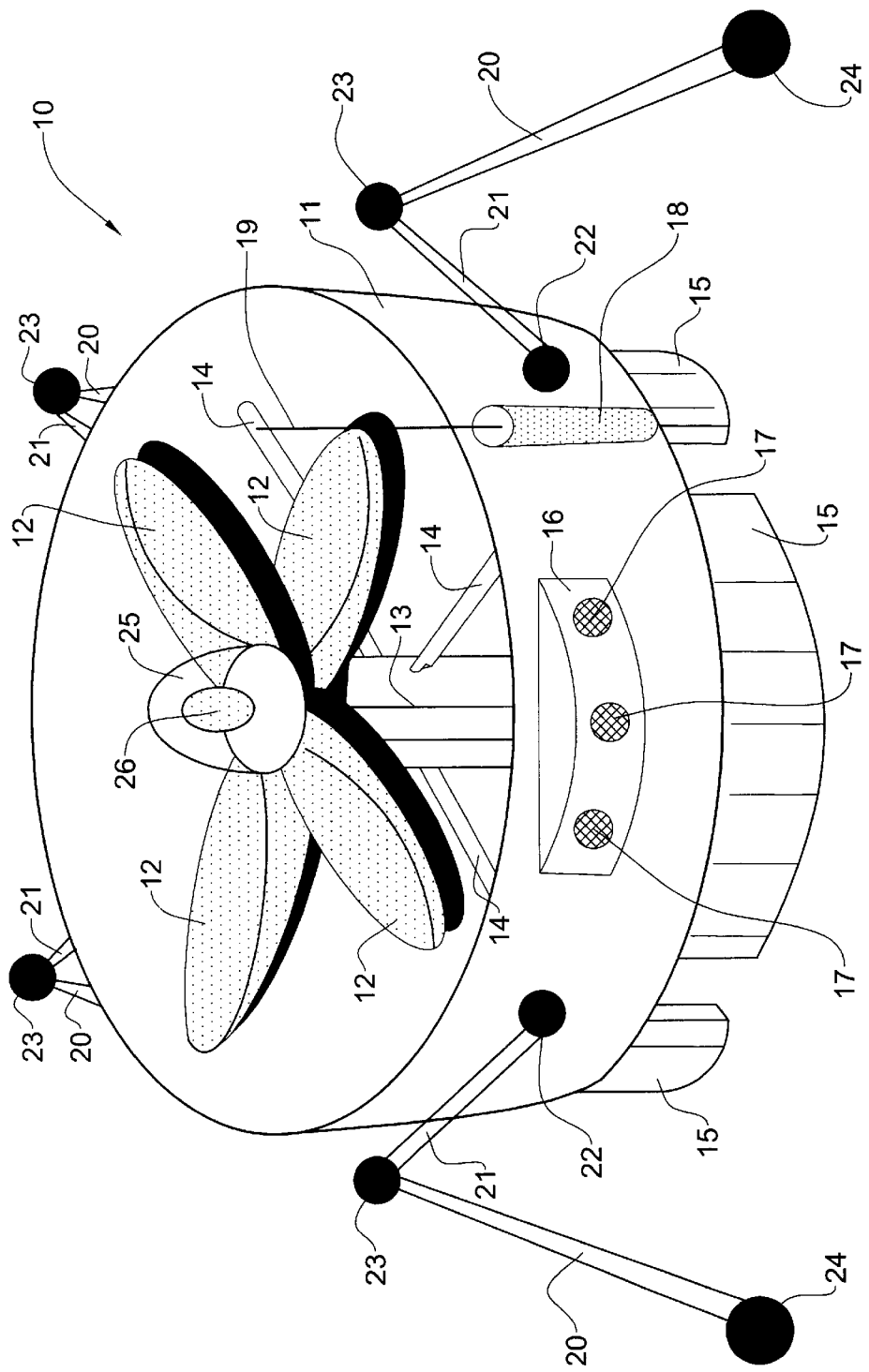

The UND: A UMD in accordance with the invention is adapted to function as a robot scout to reconnoiter a disaster area. As shown in FIGS. 1(a) and 1(b), the basic structure of UMD 10 is constituted by a toroidal duct 11 surrounding a rotor and propeller assembly 12 and a main center body 13. Centerbody 13 is supported within duct 11 by structured elements such as an array of struts 14. This basic structure creates a ducted aerodynamic fan blowing an air stream through the duct which acts to propel the UMD.

The embodiment of the UMD illustrated herein is highly compact and light weight. Duct 11 has a diameter 0.4 meters. The gross take-off weight of the UMD is 2 kg (2000 grams). The primary structural material for the UMD is KELVAR which has a high strength-to-weight ratio. The invention can, of course, be embodied in other robot scout structures having different weights and dimensions.

Centerbody 13 houses the main engine, the energy source and the electronics compartment containing a computer unit. In the present embodiment, the main rotor engine is an electrical brushless DC motor having 200 watts output power. The energy source is constituted by a bank of Lithium batteries. Structure elements 14 fix the centerbody 13 to the duct 11.

The air mobility capability of the UMD is based essentially on the concept of a ducted fan VTOL air vehicle as described in the Ebbert et. al. U.S. Pat. No. 5,295,643. A circular array of control vanes 15 mounted within toroidal duct 11 affords the aerodynamic means required to control the flight and attitude of the UMD.

In operation, when the driven propellers in the ducted fan rotate to blow an air stream in the downward vertical direction, this provides the UMD with the necessary lift forces. To cause the UMD to descend vertically toward the ground, the rotor speed is reduced. The legs of the UMD are then outstretched to function as landing gear. Upon landing at a disaster site or elsewhere, the legs function to maintain the robot erect and as a walking mechanism.

When the UMD is aloft, its flight direction is controlled by the four vanes 15 which intercept the air stream being blown out of the duct to produce a lateral force causing the UMD to fly in the North, South, East or West direction depending on the angular position of the four vanes in the circular array shown in FIG. 1(a).

To support the geo-navigation and flight control functions of the UMD, several sensors are required for this purpose. These include (see FIG. 6 which shows the units in the electronics compartment) the following:

(a) Three piezoelectric gyros 62 (such as Piezo gyro model HXM1010, commercially available from HELI-MAX which weighs only 13 grams)
(b) GPS receiver 63
(c) 3D Magnetometer 64
(d) Two piezoelectric tilt sensors 65.

Actuation means for flight control include rotor-control 76 and control vane servo actuators 77 for the four vanes. The required set of sensors 17 as shown in FIG. 1(a) are assembled in a housing 16 mounted on the exterior of the toroidal duct.

A communication unit 18 provided with an antenna 19 is mounted on the outer surface of the ducted fan 11. Low weight components are preferred for implementing communication unit 18. For example FM receiver model TETRA 301FM, commercially available from FMA Direct Inc., weighs only 14 grams and provides the onboard end of the uplink 68 (see FIG. 6). A video transmitter model TSG TX, commercially available from the Security Group which also weighs only 14 grams, provides the onboard end of the downlink 69.

Communication unit 18 establishes a two-way wireless data link between UMD 10 and remotely-located operating personnel. It also establishes a two-way wireless data link between UMD 10 and other UMDs in order to coordinate a mission assigned to a group of UMDs.

Those versed in the art will readily appreciate that the invention is by no mean bound by the specific structure of the UMD in accordance with FIGS. 1(a) and 1(b), and by the same token it is not bound by the system architecture, described with reference to FIG. 6.

Various approaches have heretofore been proposed to solve the problem of command and control of multiple unmanned mobile systems. In accordance with a preferred embodiment, a distributed-decentralized architecture is utilized, the details of which are disclosed in Yavnai A., "Distributed Decentralized Architecture for Autonomous Cooperative Operation of Multiple Agent System", in Proceedings of IEEE Symposium on Autonomous Underwater Vehicle Technology, Jul. 19–20, 1994, Cambridge, pp. 61–67 and Guelman, M., and Yavnai, A., U.S. Pat. No. 5,340,056, 1994.

The all-terrain ground mobility of the scouting device is achieved by using active multiple mechanical legs to support the UMD and cause it to walk on the terrain of the disaster site. FIG. 1(a) illustrates a situation in which the legs are in a retracted state. FIG. 1(b) illustrates a situation where the legs are in an extended outstretched position. In the present embodiment four legs are provided which are similar to those shown in FIG. 1 of U.S. Pat. No. 5,842,533 to Takeuchi.

In the present embodiment, each leg has two links, namely, an upper link 21 and a lower link 20. The kinematic arrangement of the leg's joints and links of the present invention is similar to that shown in FIG. 9 of the Paynter, U.S. Pat. No. 5,040,626. Upper link 21 is actuated by a double-actuator 22 mounted on the external surface of the duct 11. An active joint 23 provides a relative one-degree-of-freedom controlled motion between upper link 21 and lower link 20, each lower link 20 having a foot 24. The legs also function as landing gear struts, preferably with energy absorbing capability. The legs are capable of compensating for ground irregularities, so that the main body of UMD 10 is kept in a level state.

A payload housing 25 is mounted on top of centerbody 13 above the rotor assembly. Housing 25 has an optical window 26 to protect the internal electro-optical sensors and associated electronics. The main sensor housed in payload housing 25 is a video camera 70 such as a CCD video camera with resolution of 256×256 pixels, such as model SG-2000-CMOS, commercially available from The Security Group, (weighing 5 grams). A light emitting unit is aligned with the video camera 70 line-of-sight to facilitate camera operation under low light conditions. An infra-red uncooled camera 71 (see FIG. 6) is also included as an option. Payload housing 25 is capable of rotating 360 degrees around an axis which is aligned with the central axis of the centerbody 13 and with the axis of rotation of the rotor. This rotation is effected by a light weight DC servo motor 79. A suitable motor for this purpose is DC servo model LS-3.0 commercially available from Wes-Technik, Germany (weight 3 grams).

Whilst in the example above the payload includes housing 25 equipped with window 26 for accommodating video camera 70 and possibly also IR camera 71, by another embodiment other payload equipment may be employed in addition or in lieu of the specified video camera and IR camera, depending upon the designated mission(s) of the UNM.

Figure 2:
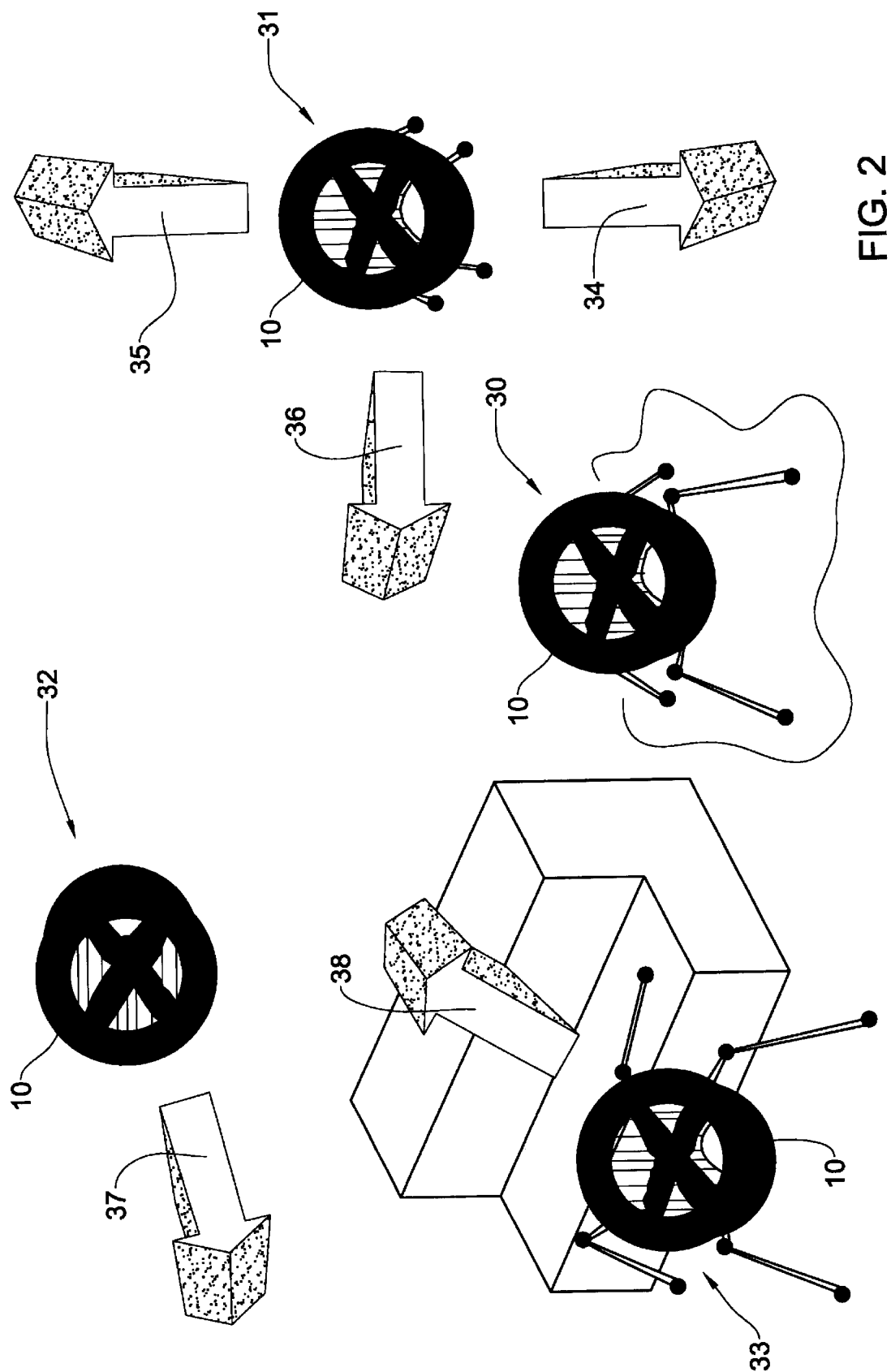
FIG. 2 is a perspective view of the unmanned mobile device in alternative mobility modes.

Turning now to FIG. 2, UMD 10 is capable of operating in several alternative modes. In a standing mode 30, UMD 10 is supported by the legs extended therefrom which support the weight of the UMD and also compensate for ground irregularities in order to maintain UMD's main body in a level state.

In a hovering mode 31, UMD 10 is capable of moving in one of three alternate directions: (1) vertical take-off 35; (2) vertical landing 34; and (3) hovering flight 36. It is also capable of hovering above the same ground location in a keep-on-station mode. In cruise dash flying mode 32, UMD 10 then flies in direction 37. In a walking mode 33, UMD 10 then walks on the ground or climbs stairs in the general direction 38. In a ground mobility mode UMD 10 can creep or otherwise move along the ground using the legs as supporting mechanisms.

Figure 3A:
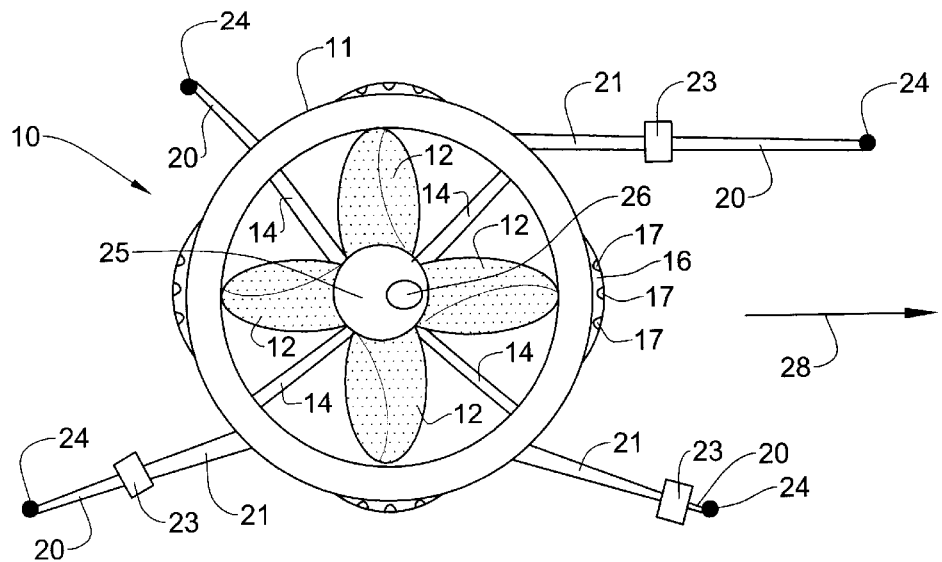
FIGS. 3(a) and 3(b) are top and side views, respectively, of the unmanned mobile device in an all-terrain walking mode.
Figure 3B:
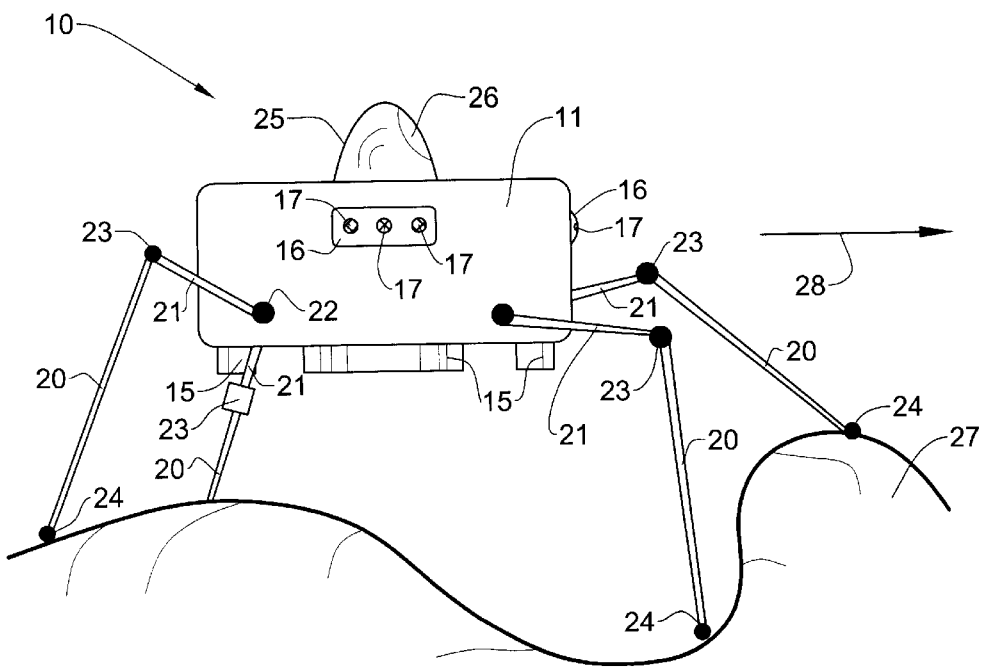

FIGS. 3(a) and 3(b) show UMD 10 in an exemplary walking mode. FIG. 3(a) being a top view and FIG. 3(b) a side view. UMD 10 is shown moving on an uneven terrain 27 in the general direction 28. In the present embodiment, UMD 10 has four legs, each leg being constituted by two interconnected links—the upper link 21 and the lower link 20. The upper link 21 is actuated by a double-actuator 22 which is mounted on the external surface of the duct 11. The double-actuator 22 provides two one-degrees-of-freedom controlled rotary motions around axes perpendicular to upper link 21.

In the present embodiment, each degree-of-freedom of the double-actuator 22 is provided by a light-weight (several grams) rotary DC servo brushless motor such as DC servo model LS-3.0, commercially available from Wes-Technik, Germany (weight 3 grams). An active joint 23 provides a relative one-degree-of-freedom controlled rotary motion between upper link 21 and lower link 20. The one-degree-of-freedom motion of the active joint 23 of the present embodiment is also provided by a light weight (several grams) rotary DC servo brushless motor such as the above noted DC servo model LS-3.0.

All three degrees-of-freedom of each leg are rotary, and each one thereof is provided by a one-degree-of-freedom rotary actuator. The kinematic arrangement of the leg's joints and links of the present invention is by one embodiment similar to that shown in FIG. 9 U.S. Pat. No. 5,040,626 to Paynter. The double-actuator 22 provides the two rotary motions around axes which are analogous to axis 1 and axis 2 in FIG. 9 of the Paynter patent. Actuator 23 provides the rotary motions around an axis which is analogous to axis 3 in the above-noted FIG. 9. The total number of active controlled degrees-of-freedom of the walking mechanism in the present embodiment is therefore twelve. Each lower link 20 has a foot 24. The foot can be either fixed to the lower link 20, or can be linked to the lower link 20 via a pivot or via a passive elastic energy absorbing element such as a spring, or a combination thereof. The legs also function as landing gear struts, preferably with energy absorbing capability. The legs are capable of compensating for ground irregularities to keep the main body level.

Automatic control of legged locomotion is necessary in order to exploit the all-terrain mobility of the UMD. It is particularly required in a disrupted terrain or environment, such as when ruined buildings are encountered by the UMD. This capability raises relatively complex control problems. For example, in the present embodiment up to as many as twelve degrees-of-freedom must be controlled simultaneously. Thus, the control system is called upon to issue as many as twelve coordinated commands to the actuators, (e.g., to DC servo motors) simultaneously, in real time.

Some of the principles of controlling the multi-legged walking mechanisms in the present embodiment are based on techniques described in the following publications: a) Todd, D. J., "Walking Machines—An Introduction to Legged Robots", Kogan Page Ltd., London U.K., 1985, pp. 91–150; b) Song, Shin-Min, et. al., "Machines That Walk", The MIT Press, Cambridge, Mass., 1989, pp. 23–164; c) Chen, Chun-Hung et. al., "Motion Planning of Walking Robots in Environments with Uncertainty", Journal of Robotic Systems, John Wiley & Sons, Inc., Volume 16, No. 10, pp. 527–545, 1999. The invention is, of course, not bound by these techniques.

When UMD 10 is walking in general direction 28, a plurality of sensors are activated in order to determine its geographical location; the geometrical features of the surrounding environment; its position relative to other objects; and any obstacles in its way. The plurality of sensors 17 which encompass a 360 degrees field of view satisfies these needs. Also supporting these needs are the electro-optical sensors housed in payload housing 25, these being directed forward through optical window 26 which is capable of rotating 360 degrees around its main axis.

Some of the sensing devices and techniques used in the present embodiment are disclosed in: a) Borenstein, J., et. al., "Mobile Robot Positioning—Sensors and Techniques", The Journal of Robotic Systems, Vol. 14, No. 4, 1997, pp. 231–249; b) Borenstein, J., et. al., "Navigating Mobile Robots: Sensors and Techniques", A. K. Peters Ltd., Wellesley, Mass., 1995; c) Adams, Martin David, "Sensor Modeling, Design and Data Processing for Autonomous Navigation", World Scientific Publishers, Singapore, 1999, pp. 153–208. The invention is, of course, not bound by these techniques.

It is known to use computer-controlled visual techniques for navigation and for obstacle detection and avoidance. Some of the visual devices and techniques for this purpose include the present embodiment, and are described in: a) Movarec, Hans P., "Robot Rover Visual Navigation", UMI Research Press, Ann Arbor, Mich., 1981, pp. 49–147; b) Robert, Luc, et. al., "Applications of Non-Metric Vision to Some Visually Guided Robotic Tasks", in Aloimonos, Yiannis, ed., "Visual Navigation—From Biological Systems to Unmanned Ground Vehicles", Lawrence Erlbaum Associates Publishers, Mahwah, N.J., 1997, pp. 89–134; c) Weng, J. J., et. al.,"Visual Navigation Using Fast Content-Based Retrieval", in Aloimonos, Yiannis, ed., "Visual Navigation—From Biological Systems to Unmanned Ground Vehicles", Lawrence Erlbaum Associates Publishers, Mahwah, N.J., 1997, pp. 178–217; d) Dean, Thomas, et. al., "Planning and Navigation in Stochastic Environments", in Aloimonos, Yiannis, ed., "Visual Navigation—From Biological Systems to Unmanned Ground Vehicles", Lawrence Erlbaum Associates Publishers, Mahwah, N.J., 1997, pp., 251–274. The invention is, of course, not bound by these techniques.

Path planning techniques employed in the present embodiment are based, e.g. on techniques described in the following references: a) A system for obstacle avoidance and path planning disclosed in U.S. Pat. No. 5,502,638 to Takenaka b) "Motion Planning of Walking Robots in Environments with Uncertainty", Chen et. al., Journal of Robotic Systems, John Wiley & Sons, Inc., Volume 16, No. 10, pp. 527–545, 1999.

The problem of indoor navigation falls into two categories; namely navigating with an a-priori map or database; and navigating without this map or database. Where an a-priori map is available, the navigation function uses a-prior data about the building layout, by employing appropriate LFMs—local feature maps (see FIGS. 8(a) and 8(b)). If an a-priori map is not available or if the object 54 to be visited has been damaged so that the a-priori map is no longer a true representation of the actual object, then a different navigation procedure is executed, the so-called "navigating in a maze". A process called "map building" is then a part of the navigation process.

In order to meet the requirements for a highly compact and light weight UMD, use is made in the present embodiment of miniature light weight sensors. For example, a CCD camera with a resolution of 256×256 pixels is only 5 grams in weight. (Model SG-2000-CMOS, commercially available from The Security Group) Also usable are acoustic sensors which weigh only 5 grams each, or infra-red LED-based range finders which weigh only 5 grams each.

Figure 4:
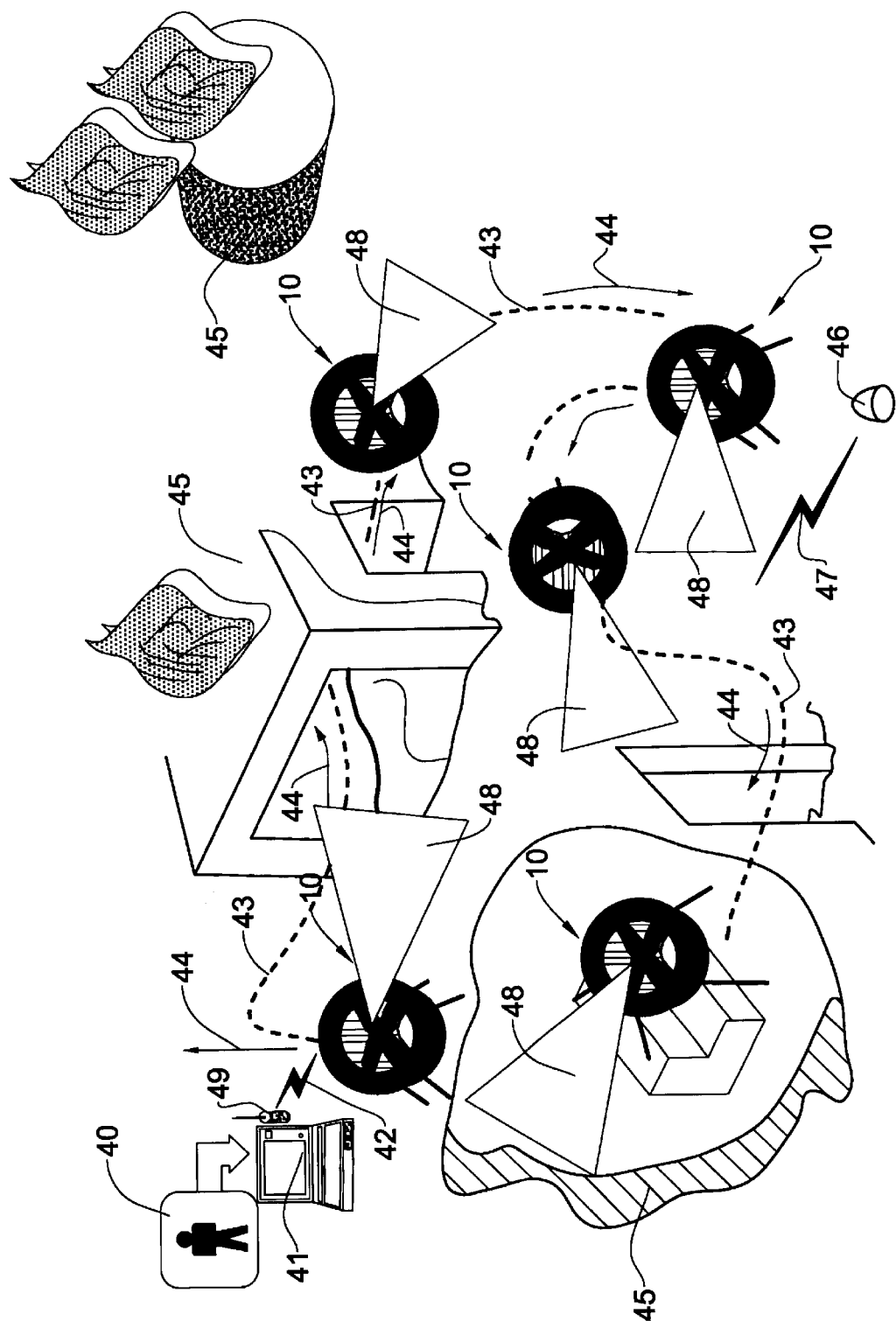
FIG. 4 is a perspective view of the unmanned mobile device in a typical data gathering and situation-monitoring scenario in a disaster area.

Scenario: Referring now to FIG. 4 illustrated therein is a typical, yet not exclusive, scenario of a UMD executing a data gathering and situation-monitoring mission within a disaster site.

An operator 40 is put in charge of operating UMD 10 and of supervising its operation from a safe location, preferably in the vicinity of the disaster area. When arriving at the station from which to launch UMD 10 on its scouting mission and to thereafter manage its operation, operator 40 then has the following series of pre-mission activities to undertake: a) unpack UMD 10 from its protective packaging; b) place UMD 10 on an uncluttered surface for safe take-off and landing; c) press a key on the command and control portable unit keyboard in order to transmit an ON command (see OnCmd 99 in FIG. 7) so as to "Wake-Up" UMD 10 and change its state from System Non-Active state 89 to System Preparing state 90. Upon entering the state of System Preparing 90, a Built-In-Testing ("BIT") is automatically initiated; d) using the command and control portable unit 41 to edit a mission; e) press a key on the command and control portable unit keyboard in order to download the mission plan file to UMD 10 via wireless data link 42.

Figure 5:
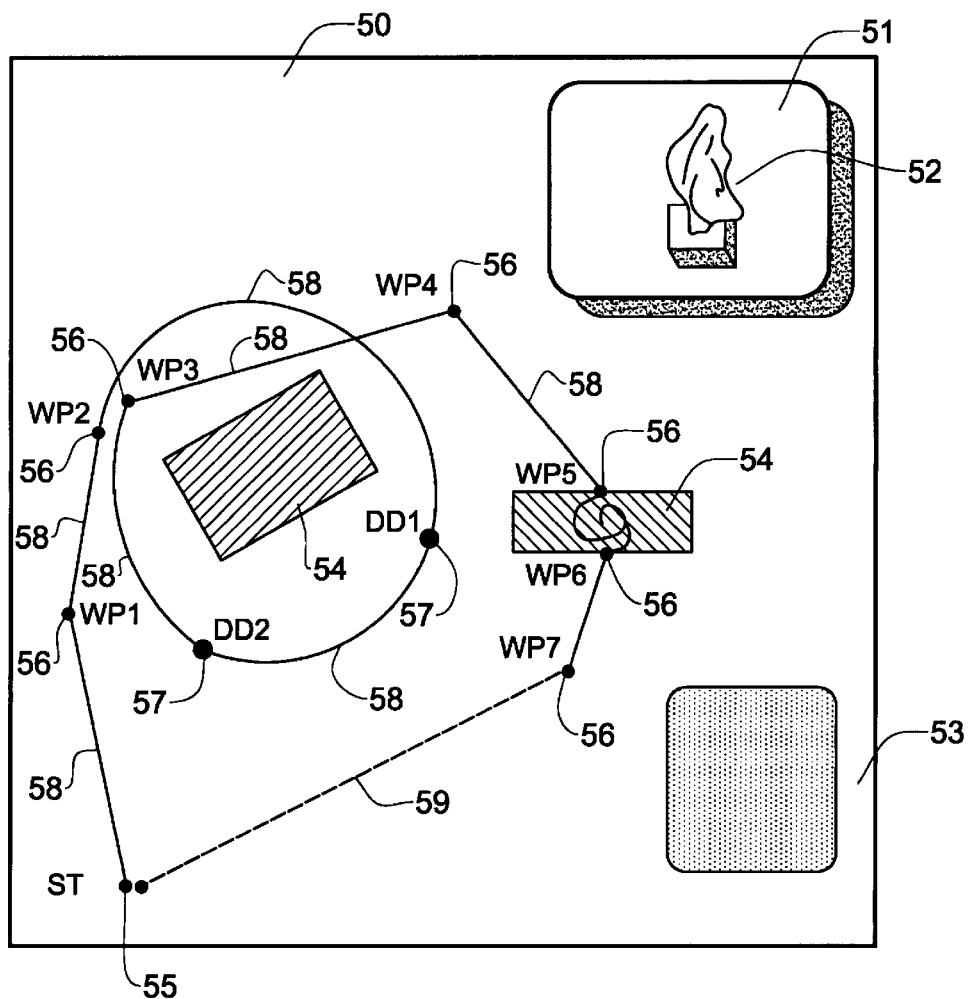
FIG. 5 is an overhead view of the display of the command and control portable unit.

When this pre-mission series of activities is completed, UMD 10 is now ready for its mission. It is important that the pre-mission procedure be accelerated to enable a fast reaction to a disaster situation. Thus, the mission edition activity, the most time consuming activity of all pre-mission activities, is designed to be as rapid and as simple as possible. The mission editing display is shown in FIG. 5.

As previously mentioned, operator 40 uses a command and control portable unit 41 to edit a mission plan and to control operation of UMD 10 while on its mission. A wireless communication unit 49 is connected to the command and control portable unit 42, thereby establishing a two-way data link with UMD 10 and with self-contained unattended sensor means 46, if these are deployed by UMD 10.

After a mission plan is edited and generated, it is transmitted and downloaded to UMD 10 via wireless data link 42. While in operation, operator 40 may transmit orders to UMD 10 and receive data from it via data link 42.

As shown in FIG. 4, UMD 10 is travelling along the planned path 43 in the general direction 44. And in a manner appropriate to the situation, UMD 10 is moving in various alternate modes, as described in connection with FIG. 2. In the actual scenario illustrated in FIG. 4, UMD 10 is moving either outside or inside a burning building 45. When UMD 10 is walking or otherwise moving within this building, it then navigates its way either with or without an a-priori map. Where an a-priori map is available and is applicable to the situation, the navigation function uses a-priori data about the building layout, by employing the appropriate LFMs—local feature maps (see FIGS. 8(a) and 8(b)). When an a-priori map is not available or where the building 45 to be explored has been so damaged that an a-priori map is no longer applicable, a different navigation procedure is executed and a process called "map building" becomes a part of the navigation process.

As may be appropriate to the circumstances, UMD 10 can land vertically, stand for a while on a supporting surface, take-off vertically, and then hover over the site. This sequence of movements can be repeated when necessary. When UMD 10 is gathering data and monitoring the situation, its sensors are then operative. The electro-optical sensor housed in payload housing 25 has a field-of-view 48 which is directed forward in the direction of movement or toward an area of interest. Other sensors which constitute payload whose activation depends on the specific situation may include a microphone 72, a smoke detector 73 and a gas detector 74. It may also be desirable to include a seismograph to sense earth tremors.

UMD 10, when landing vertically, can then deploy by using a device release actuator 80, self-contained unattended sensor means 46 for further data gathering in the disaster area. Sensor means 46 which may be situated on various supporting surfaces such as on the ground transmits data it gathers to communication unit 49 attached to the command and control portable unit 41 via a wireless data link 47.

Shown in FIG. 5 is an overhead view of display 50 of the command and control portable unit 41 in accordance with one embodiment of the invention. Display 50 comprises a video display window 51, as well as an alphanumeric display window 53. When UMD 10 is on the disaster site, a scene 52 sensed by the electro-optical video sensor, (see video camera 70 in FIG. 6) and transmitted from UMD 10 via wireless RF data link 42 to the communication unit 49, is displayed on video display window 51. The largest area of the display is then used for the graphical symbolic representation of the main elements of the mission plan. By way of example, two objects 54 in the disaster site have to be monitored.

Operator 40 edits a mission plan consists by this embodiment of the following elements: a) a mission starting and terminating location ST 55; b) a travelling route represented by an ordered series of way-points, WP 56, connected by route segments 58. In the example shown in FIG. 5, there are seven way-points WP 56 designated WP1 to WP7 by the order they are planned to travel. Each WP 56 represents a specific location; c) a series of ordered device deployment locations DD 57. In FIG. 5, there are two DD 57 points, DD1 and DD2; d) a return segment 59 which connects the last way-point WP7 to the terminal point 55; e) an indoor travelling segment inside an object to be monitored, this segment being between WP5 and WP6.

In a situation where local feature maps—LFMs, (see FIG. 8b), of the object 54 to be monitored, are available a-priori, these are linked to the mission plan and downloaded from the memory storage of the command and control portable unit 41 to UMD 10, along with the mission plan. For such situations, the command and control portable unit 41 has a data base of the LFMs, (see FIGS. 8(a) and 8(b)) of objects in the disaster area. This data base is downloaded and stored in the command and control portable unit 41 before going to the disaster area.

Figure 6:
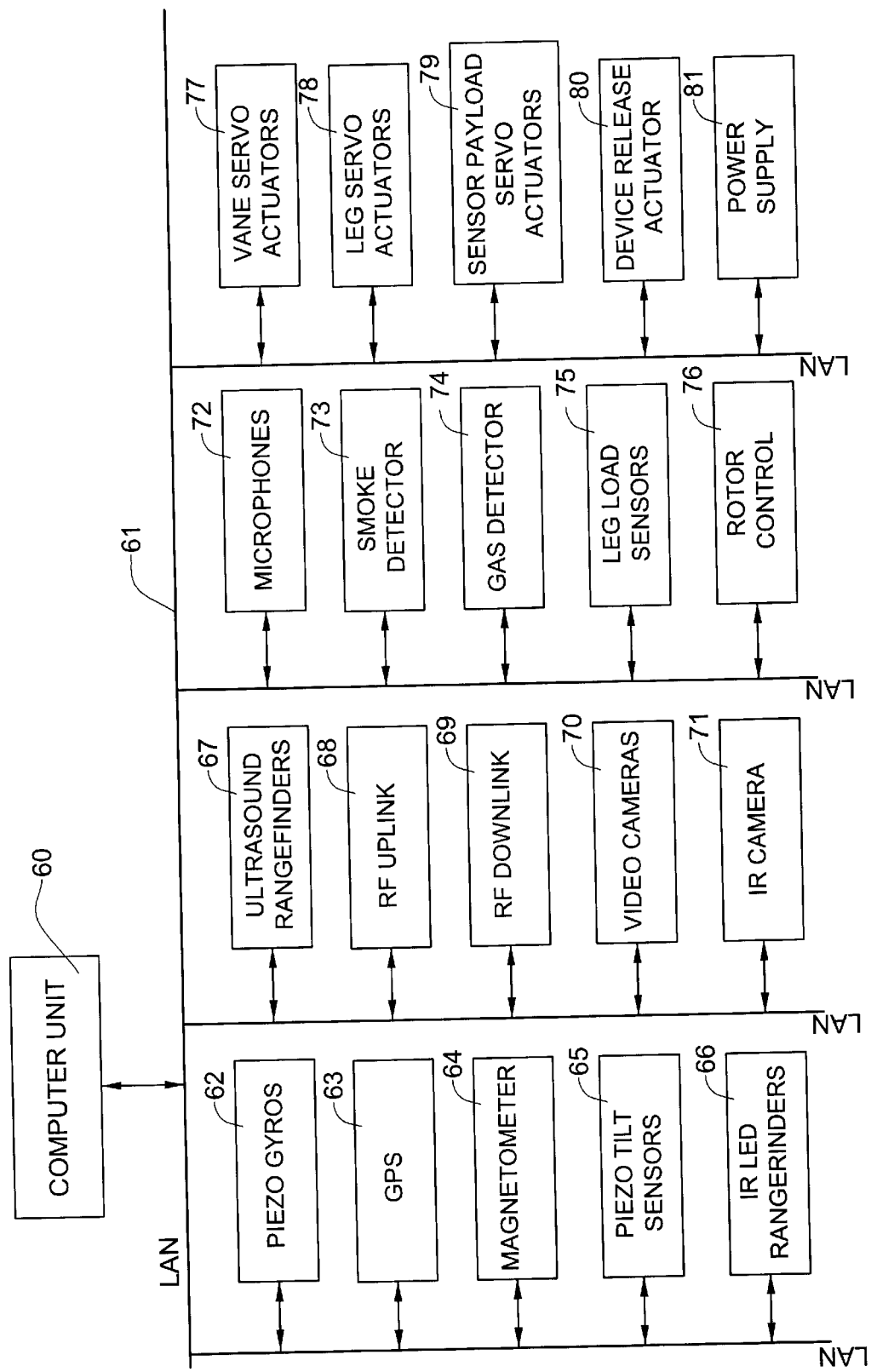
FIG. 6 is a functional diagram of the electronics unit architecture.

As shown in FIG. 6, the functional architecture of the electronics unit is of the "Bus Network Topology" type. Computer unit 60 is connected to all of the associated elements via a local area network—LAN 61. Computer unit 60 is provided with processing elements, memory elements, and I/O elements and whatever other elements are desirable to execute all of the required computations, such as: a) flight control; b) navigation; c) sensor data processing; d) multi-legged control; e) path planning and obstacle avoidance.

In UMD 10, a set of three piezoelectric gyros 62 are used to measure the angular rate about three perpendicular axes which together establish a right-handed orthonormal coordinate system. GPS receiver 63 provides location and velocity navigational information, while a magnetometer 64 provides directional data with respect to the geomagnetic field which is in turn related to the geographic coordinate system and thus provides approximated azimuth information. A set of piezoelectric tilt sensors 65 serve to determine the attitude of the UMD 10 with respect to the gravity vector.

Also provided are infra-red ("IR") light emitting diodes ("LED")-based rangefinders 66 to effect short range distance measurements (effective up to about 10 meters) to surrounding objects. These measurements provide crucial data for positioning, navigating and obstacle avoidance when UMD 10 is moving in its ground mobility mode. In the present embodiment, each rangefinder 66 weighs only 5 grams. A plurality of acoustic rangefinders 67 are also used for measuring distance to the surrounding objects. The addition of acoustic rangefinders 67 affords more comprehensive coverage than when using only IR-LED rangefinders 66.

The two-way wireless data link of the robot scout is preferably a radio-frequency RF data link. It comprises a RF uplink 68 for communicating data to UMD 10, and an RF downlink 69 for communicating data, including video data, from the UMD. A commercially-available receiver for this purpose may weigh as little as 12 grams for a range of over 2 kilometers. A commercially-available video transmitter may weigh as little as 14 grams for a range of over 4 kilometers, providing that a line-of-sight exists between the transmitter and receiver.

A video camera 70, preferably a CCD type, serves to provide: a) a close-up viewing of the disaster site which can be displayed to remote operator 40; b) a visual sensor for visual positioning, navigation and obstacle avoidance. Similar arrangements are described in: a) Movarec, Hans P., "Robot Rover Visual Navigation", UMI Research Press, Ann Arbor, Mich., 1981, pp. 49–147; b) Robert, Luc, et. al., "Applications of Non-Metric Vision to Some Visually Guided Robotic Tasks", in Aloimonos, Yiannis, ed., "Visual Navigation—From Biological Systems to Unmanned Ground Vehicles", Lawrence Erlbaum Associates Publishers, Mahwah, N.J., 1997, pp. 89–134; c) Weng, J. J., et. al.,"Visual Navigation Using Fast Content-Based Retrieval", in Aloimonos, Yiannis, ed., "Visual Navigation—From Biological Systems to Unmanned Ground Vehicles", Lawrence Erlbaum Associates Publishers, Mahwah, N.J., 1997, pp. 178–217; d) Dean, Thomas, et. al., "Planning and Navigation in Stochastic Environments", in Aloimonos, Yiannis, ed., "Visual Navigation—From Biological Systems to Unmanned Ground Vehicles", Lawrence Erlbaum Associates Publishers, Mahwah, N.J., 1997, pp., 251–274. The invention is, of course, not bound by these arrangements.

In practice, flood lights may be added to the UMD in order to provide acceptable light conditions for the camera, especially in indoor situations. An uncooled infra-red camera 71 may be used for poor light situations, as well as a hot spot detector.

For situation monitoring missions, such as for finding missing people in ruined buildings use may be made of microphones 72. Acoustic signals received by the microphones 72 are conveyed to operator 40 at the remote station via the RF downlink 69. A smoke detector 73 provides means to detect sources of smoke and smoke-generating situations. A gas detector 74 serves to detect gas contamination, especially in areas of high and dangerous gas concentration.

The legs of UMD 10 may be equipped with leg load sensors 75 for controlling the multi-legged walking. As an alternative, measuring the current at the leg servo motors may provide the necessary control information.

A rotor control function 76 provides the command signals necessary to control rotor motion. A vane servo actuators function 77 provides the command signals to control vanes 15. A leg servo actuators function 78 provides the command signals for the plurality of leg actuators. A sensor payload servo actuator 79 provides the command signals to control the payload servo. A device release actuator 80 is used to produce the command signal to the device release actuator when unattended sensor means 46 has to be deployed. Power supply 81 supplies all of the electrical power consumed by all onboard units. For this purpose use may be made of a bank of Lithium batteries.

Figure 7:
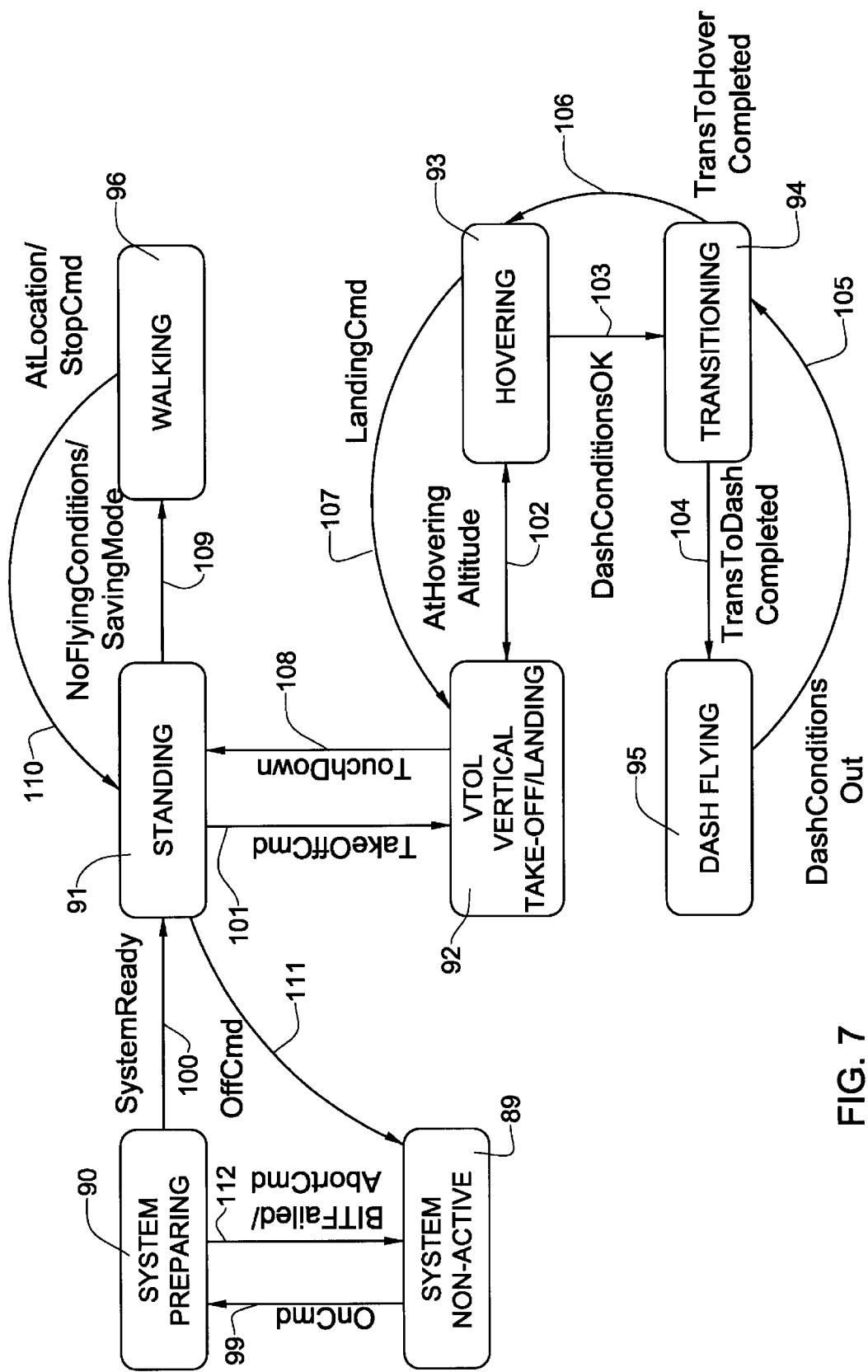
FIG. 7 is a diagram of the main operational and mobility modes and the associated inter-mode transition logic.

FIG. 7 is a diagram state graph notation of the main operational and mobility modes of UMD 10 and of the transitions between these modes, in accordance with one embodiment of the invention. A notation of state is assigned to each mobility mode, as well as to start and standing situations. The following states constitute, by this embodiment, the state graph: a) system non-active 89; b) system preparing 90; c) standing 91; d) VTOL—vertical take-off/landing 92; e) hovering 93; f) transitioning 94; g) dash flying 95; h) walking 96. In FIG. 7, states 92 through 95 are air mobility states and State 96 is a ground mobility state.

Prior to the mission, and after completing the mission, the power is preferably off, and UMD 10 is then in its system non-active state. Upon receiving an On command OnCmd 99 from operator 40 via the data link, the state of UMD 10 is transitioned to system preparing state 90. On entering the system preparing state 90, a Built-In-Testing ("BIT") procedure is automatically initiated. If the BIT result is OK, and the mission plan has been downloaded correctly, the condition SystemReady 100 is logically TRUE, and the state of UMD 10 is transitioned to standing state 91. But if the BIT procedure failed, BITFailed condition 112 is TRUE. Or in case operator 40 sends a mission abort command AbortCmd 112, the state of UMD 10 is transitioned to system non-active state 89 and the UMD 10 power is off.

Depending on the specific phase of the mission, when in standing state 91, various UNM functions may be active, as required. For example, UMD 10 when in the standing state 91 may be in a waiting situation, in a data gathering situation, or in a sensor means 46 deploying situation, or in a combination of these situations. Upon receiving a Take-OffCmd 101, UND 10 is transitioned from standing state 91 to VTOL state 92, starting to take-off. If flying conditions do not exist, the UMD is either in a staying or standing state 91 or is transitioned to walking state 96.

While in VTOL state 92, UNM 10 is transitioned to hovering state 93 when its altitude approach the desired hovering altitude, the condition HoveringAltitude 102 is then logically TRUE. UMD 10 keeps hovering until one of the two following conditions is met: a) conditions for dash flight exists, condition DashConditionsOK 103 is TRUE and UMD 10 is then transitioned to intermediate transition state 94; b) a landing command LandindCmd 107 was issued, either by remote operator 40, or internally by its mission controller, and UMD 10 is transitioned to VTOL state 92, starting to land. When the UMD 10 is touching down a supporting surface, condition TouchDown 108 is TRUE, and the UNM 10 is transitioned to standing state 91.

Upon transitioning from hovering state 93, to transitioning state 94, UNM 10 is then performing a transitioning maneuver, in which the condition TransToDashCompleted 104 is TRUE, and UNM 10 then enters the dash flying state 95. As long as the conditions for flying in a dash flying mode exists, UNM 10 remains in this state. If these conditions cease to exist, condition DashConditionsOut 105 is TRUE, and UMD 10 is transitioned to the temporary transitioning state 94. Upon completing the transitioning maneuver, condition TransToHoverCompleted 106 is TRUE, and UMD 10 is transitioned to hovering state 93.

The transition from an air mobility mode to a ground mobility mode and vice versa, is always carried out by first going to standing state 91, and thereafter to the desired mobility mode, either ground or air.

While in standing state 91, upon receiving a WalkingCmd 109, UMD 10 is transitioned to walking state 96. The WalkingCmd 109 is issued either by remote operator 40, or internally by the UMD mission controller. When in the walking state 96, UND 10 is keep walking unless it comes to the desired destination, AtLocation condition 110 is TRUE or stop command StopCmd 110 is issued either by remote operator 40 or internally by the UMD mission controller. A situation which is typical for the internal issuance of a StopCmd 110 is when UMD 10 encounters a large obstacle while walking. When UMD 10 is in standing state 91, an off command OffCmd 111 will transit the UMD 10 state from standing state 91 to system non-active state 89, and UMD 10 power will shut-off. OffCmd 111 is issued either internally by the UMD 10 mission controller or by the remote operator 40. Upon completing the mission, OffCmd 111 is usually issued internally.

Figure 8A:
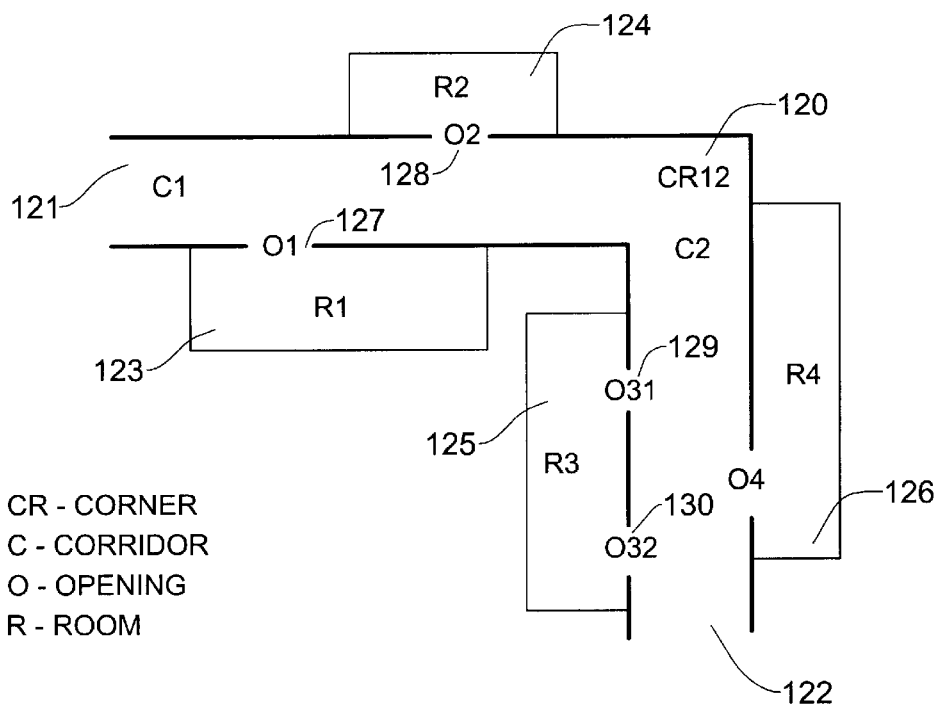
FIGS. 8(a) and 8(b) are layouts of a building interior and its associated graph-based data structure representation.
Figure 8B:
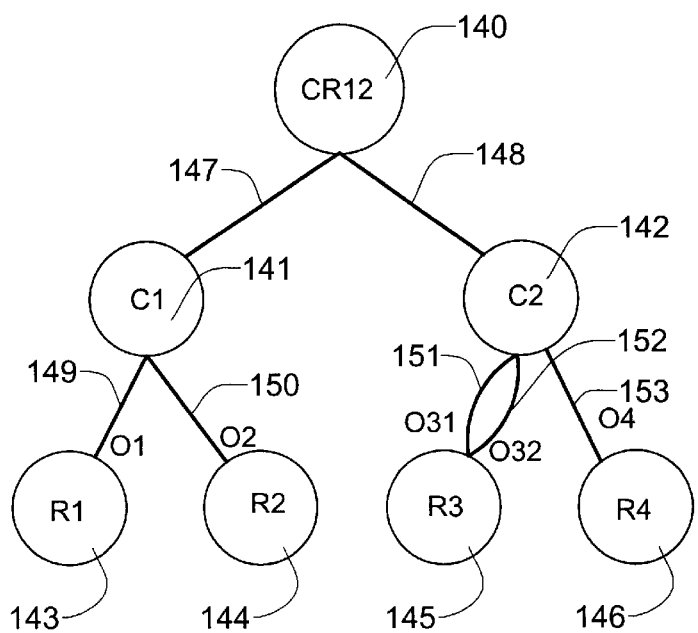

FIG. 8(a) shows the layout of a building interior section, while FIG. 8(b) is its associated graph-based data structure representation (according to one possible variant), termed Local Feature Map—LFM. By this example, FIG. 8(a) is a layout of a building section consisting of: a) two corridors C1-121 and C2-122; b) a corner CR12 120 which connects the two corridors; c) four rooms R1 123, R2 124, R3 125, and R4 126 which are accessed from the corridors through openings; d) the following openings: O1 127 between corridor C1 121 and room R1 123; O2 128 between corridor C1 121 and room R2 124; O31 and O32 both between corridor C2 122 and room R3 125; O4 131 between corridor C2 122 and room R4 126.

FIG. 8(b) is an example of the associated Local Feature Map—LFM which is used in the present embodiment to represent the essential features of the building section layout. The data structure which is used to represent the LFM is a non-directional graph (See Even, S., "Graph Algorithms", Computer Science Press, Maryland, USA, 1979, for more details on non-directional graphs).

Referring now to FIG. 8(b), the root node of the graph is the corner CR12 140. It has two associated daughter nodes, corridor C1 node 141 and corridor C2 node 142. The connecting arcs 147 and 148 symbolizes the connection between the corner CR12 and its connected corridors C1 and C2. Corridor C1 node 141 has two associated daughter nodes namely, room R1 node 143 and room R2 node 144. The connecting arcs 149 and 150 symbolize the associated openings O1 149 and O2 150 respectively. Similarly, corridor C2 node 142 has two associated daughter nodes namely, room R3 node 145 and room R4 node 146. The connecting arcs 151, 152 and 153 symbolizes the associated openings O31 151 and O32 152 and O4 153, respectively. Whenever the layout of the buildings to be monitored by the UMD 10 is known a-priori, the associated LFMs can be prepared in advance. It should be noted however, that although an LFM is possibly prepared a-priori, during a major disaster, such as an earthquake, so many changes may occur that the original LFM may no longer represent the actual layout.

While there has been disclosed a preferred embodiment of a UMD functioning as a robot scout, it is to be understood that many changes may be made therein without departing from the scope of the following claims.

What is claimed is:

1. An unmanned mobile device remotely-controlled to function as a robot scout to enter a site of interest and to execute a mission; said device comprising:

A. an aerodynamic flying assembly provided with retractable legs serving as landing gear when the assembly lands at the site and then functions as a ground locomotion mechanism; and B. remotely-controlled means that include processor means associated with the assembly which render it operable in at least one of the following modes that includes:
   1) an air-mobility mode in which the assembly is capable of flying to the site and of hovering thereover, and is also capable of vertical take-off and landing at the site, the legs then being extended to function as landing gear,
   2) a ground-mobility mode in which the extended legs then function as a walking mechanism to cause the assembly to move through the site;

whereby the device is capable of executing the mission.

2. The device according to claim 1, wherein said area of interest is a disaster area and wherein said mission includes communicating to a rescue mission information regarding conditions prevailing at the site making it possible to then decide on rescue measures appropriate to these conditions.

3. The device according to claim 1, wherein said walking mechanism is a legged locomotion mechanism, capable to displace the assembly.

4. A device as set forth in claim 1, in which the assembly includes a toroidal duct having a motor-driven propeller mounted therein which forces air to flow through the duct to propel the assembly.

5. A device as set forth in claim 4, in which the assembly is provided with adjustable vanes which are controlled to establish the flight of the assembly.

6. A device as set forth in claim 4, in which the propeller is rotated by a battery-powered dc motor.

7. A device as set forth in claim 4, in which the duct is fabricated of a material having a high strength-to-weight ratio.

8. A device as set forth in claim 1, in which each of said legs is formed by a lower link pivotally joined to an upper link.

9. A device as set forth in claim 8, in which each leg has three degrees of freedom.

10. A device as set forth in claim 1, in which the assembly is provided with a payload that includes at least one condition sensor to sense a prevailing condition on the site.

11. A device as set forth in claim 10, in which the condition sensor is a video camera which views the site and communicates an image thereof to a remote operator.

12. A device as set forth in claim 11, in which the video camera is mounted in a transparent capsule at the center of the assembly at its upper end and scans 360 degrees about the assembly.

13. A device as set forth in claim 10, in which the condition sensor is a smoke detector responsive to smoke emanating from the site.

14. A device as set forth in claim 10, in which the condition sensor is an acoustic detector which picks up sounds emanating from the site.

15. A device as set forth in claim 10, in which the condition sensor is a gas detector.

16. A device as set forth in claim 11, in which the assembly is provided with means including a position detector to sense the position of the assembly relative to the site as it traverses the site.

17. A device as set forth in claim 16, in which said means to sense the position of the assembly senses the presence of an obstacle in a path of the assembly to avoid the obstacle.

18. A device as set forth in claim 1, in which the device includes means to gather information with regard to the site and a radio transmitter to communicate information gathered by the robot scout to an operator.

19. A device as set forth in claim 18, in which the assembly is provided with a radio receiver to receive command signals from a remote operator to control the operation of the device.

20. A device as set forth in claim 1, in which the assembly is provided with a payload that includes fire extinguishing equipment.

21. A device as set forth in claim 1, in which the assembly is provided with a payload that includes sensors for geo-referenced navigation and flight control function.

* * * * *

UNITED STATES PATENT AND TRADEMARK OFFICE
CERTIFICATE OF CORRECTION

PATENT NO. : 6,588,701 B2
DATED : July 8, 2003
INVENTOR(S) : Arie Yavnai

It is certified that error appears in the above-identified patent and that said Letters Patent is hereby corrected as shown below:

<u>Title page,</u>
Item [56], References Cited, below the list of U.S. PATENT DOCUMENTS, please insert the following foreign patents/publications cited:

-- FOREIGN PATENT DOCUMENTS

| 0661206 | 3/2000 | EUROPE |
| 95/30575 | 11/1995 | WO -- |

Signed and Sealed this

Fourth Day of May, 2004

JON W. DUDAS
*Acting Director of the United States Patent and Trademark Office*